United States Patent Office 2,828,186
Patented Mar. 25, 1958

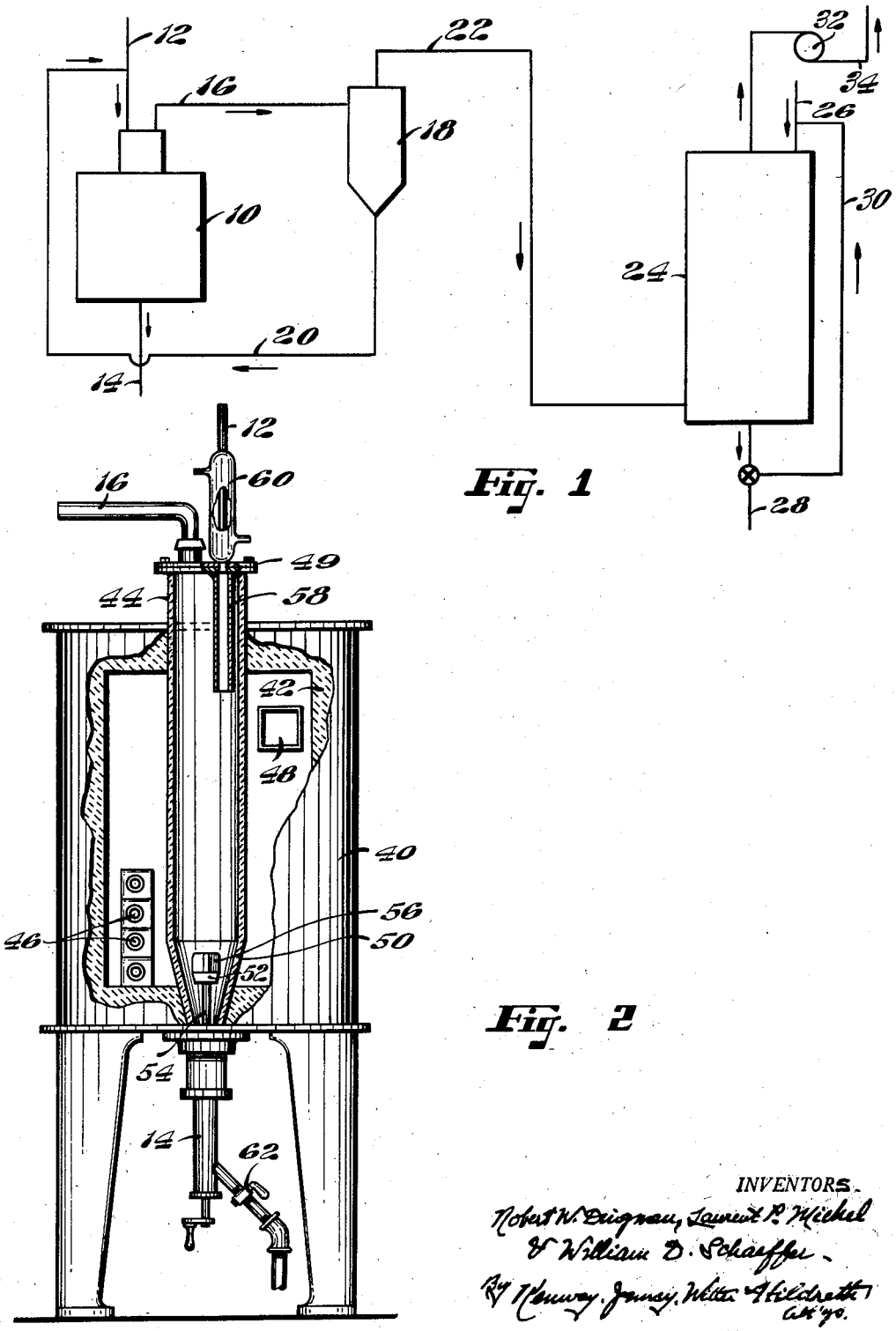

2,828,186

PROCESS AND APPARATUS FOR THE PRODUCTION OF ALUMINUM OXIDE

Robert W. Dingman, Pampa, and Laurent P. Michel, Houston, Tex., and William D. Schaeffer, Coopersburg, Pa., assignors to Godfrey L. Cabot, Inc., Boston, Mass., a corporation of Massachusetts Continuation of application Serial No. 323,682, December 2, 1952. This application March 2, 1956, Serial No. 569,113

8 Claims. (Cl. 23—142)

This invention relates to the production of finely divided aluminum oxide from aluminum sulfate. More particularly, it comprises a new and improved process for producing finely divided aluminum oxide and sulfur oxides from hydrated aluminum sulfate containing 6 or more molecules of water per molecule of aluminum sulfate. The invention includes within its scope novel apparatus by which the said process may be advantageously carried out.

An important advantage of the process of this invention over processes heretofore known is that the commercially available hydrated aluminum sulfate can be used without alteration as the raw material. In prior processes it has been essential, in order to produce a finely divided aluminum oxide, to dehydrate the raw material under vacuum. Without that preliminary step the sulfate melts and its crystals dissolve in its water of hydration. The eventual product is a hard cake which is very difficult to process.

It is the principal object of our invention to provide a process and apparatus for rapidly converting hydrated aluminum sulfate to aluminum oxide and $SO_3$ in a single step.

It is a further object of this invention to provide a continuous process for obtaining aluminum oxide from hydrated aluminum sulfate at high yields.

It is a further object of this invention to provide a continuous process for converting the sulfate of aluminum to the oxide in the practice of which the oxides of sulfur may be rapidly removed from the reaction zone and the formation of $SO_2$ thus kept to a minimum.

It is a further object of this invention to provide an apparatus in which hydrated aluminum sulfate can be continuously and efficiently converted to the oxide.

Broadly, the process of this invention consists in the steps of continuously introducing hydrated aluminum sulfate as a molten spray or in solid particulate form into a heated reaction zone maintained at a temperature above 770° C. and preferably below about 1100° C., continuously removing the gaseous decomposition products therefrom as they are formed, retaining the solid product therein for a time sufficient to remove substantially all of the undecomposed aluminum sulfate remaining admixed therewith after the initial reaction and recovering the aluminum oxide product. Additional steps include passing the gaseous decomposition products having sulfate fines suspended therein through a cyclone separator, recycling the separated fines to the reaction zone and conducting the gases to a sulfur recovery zone. The aluminum oxide product is withdrawn from the reaction zone intermittently or continuously as expedient and while in the reaction zone may further be mechanically agitated to improve heat transfer. The aluminum sulfate raw material may be introduced into the reaction zone either as a solid or as a liquid.

This invention will best be understood and appreciated from the following description of the process and apparatus illustrated in the accompanying drawings in which Fig. 1 is a flow diagram of the process and Fig. 2 is a view in vertical cross section of one suitable form of reactor.

Referring to Fig. 1 the assembled apparatus includes a reactor 10 (shown in detail in Fig. 2) supplied at the top through feed line 12 and having two discharge lines, 14 for solid product and 16 for gaseous product. Line 16 connects into a cyclone or other suitable separator 18 from the bottom of which leads solids conduit 20 and from the top of which leads gas conduit 22. Solids conduit 20 connects into feed line 12 for recirculation and gas conduit 22 connects into the bottom of scrubber 24. Inlet pipe 26 is provided for the introduction of scrubbing solution into scrubber 24 and outlet pipe 28 for discharging the liquids. A portion of the liquids may be recycled through line 30 if desired. The exhaust gases are removed by a fan 32 and discharged into a stack 34. A cooling device (not shown) may be provided in conduit 22 if desired.

The reactor of this invention in which the process of this invention may conveniently be carried out is shown in detail in Fig. 2. It consists of a furnace 40 lined with refractory material 42 and having a refractory tube 44 positioned vertically therein. Burners 46 are provided to fire into the furnace, preferably in a direction tangent to the inner wall thereof. A flue 48 provides for the escape of combustion product gases which may be utilized to heat cyclone 18 and the exhaust fan 32 to prevent condensation of moisture therein.

The refractory tube 44 which may also be referred to as the reaction tube, extends through the furnace 40 and is heated by the flame from burners 46. The upper end of the tube is covered by a plate 49 having openings to which are connected feed pipe 12 and gas discharge pipe 16. The bottom end of tube 44 is preferably a tapered section 50 in which a plug 52 may be seated to prevent escape of solid product from the heated zone. Plug 52 is supported by rod 54 arranged for both rotation and vertical travel in product discharge pipe 14. Plug 50 may advantageously have vanes 56 attached to its upper surface which serve to agitate the bed of solid product when rod 54 is rotated.

Secured to the under surface of cover plate 49 is a cylindrical baffle 58 extending part way into tube 44. It is advantageously employed to prevent short circuiting of the system which might tend to cause an excessive amount of raw material to be carried out of the tube through discharge pipe 16. Even with baffle 58 in place solid fines of the hydrated sulfate will to some extent be carried out in the by-product gases and must be recovered in separator 18.

Because the section of feed pipe 12 close to reaction tube 44 would otherwise become hot and cause the aluminum sulfate raw material to adhere to its walls, a cooling jacket 60 is advantageously employed around the feed pipe. Cooling fluid is circulated therethrough in the usual manner. Other means of cooling known to those skilled in the art may be employed as well. If the aluminum sulfate is introduced as a molten spray a heating fluid may be circulated through jacket 60.

Although plug 52 will ordinarily serve to control the removal of solid product from reaction tube 44 additional control means may be provided. As illustrated a valve 62 is included in the product discharge pipe and when closed will permit the raising of plug 52 without allowing any of the product to escape.

The process is carried out as follows: Hydrated aluminum sulfate is continuously fed at a controlled rate through feed pipe 12 and baffle 58. As the sulfate enters the hot reaction zone its particles explode as the sulfate is first dehydrated and then decomposed to aluminum oxide, which drops to the bottom of reaction tube 44, and to oxides of sulfur, oxygen and steam which flow upwardly out of the reactor through flue 16. The solid product is retained in the bottom of the reaction tube 44 until substantially all of the aluminum sulfate remaining admixed therewith is decomposed. After the process has been carried out long enough to provide an accumulation of aluminum oxide this product is withdrawn from the bottom of the bed at a controlled rate so that the residence time will be uniform for all of the product.

Since the sulfate raw material will contain fines the by-product gases are preferably passed through cyclone separator 18 in which most of the fines will be recovered and may be recycled to feed pipe 12. The sulfur oxides mixed with the water driven from the hydrated aluminum sulfate will then pass through a suitable recovery system of which there are several types well known to the art. In one convenient system the oxides of sulfur are converted to sulfuric acid and recovered in that form.

The extent of decomposition of the sulfate and the particle size of the resulting solid product may be accurately controlled by suitable regulation of the raw material feed rate, temperature within the reaction tube and residence time of the product in the bottom of the tube. Products of differing properties may be produced by varying the above operating conditions.

Feed tube 12 may be supplied by any convenient means as through a closed conduit having a rotary valve, or, in an open system, from a vibratory or belt conveyor and the like.

Alternatively, the aluminum sulfate may be introduced into reaction tube 44 in the molten state. In such case feed tube 12 will terminate within the reactor in suitable spray nozzles and the feed reservoir will be heated. Jacket 60 may then be used to conduct hot rather than cold fluid, or other feed tube heating means may be employed or external heating may be omitted entirely. The advantage of spraying the material into the reactor as a liquid of course lies in the small size of the spray droplets which are considerably smaller than the solid particles. The smaller the size of the sulfate increments the greater will be the heat transfer efficiency to reduce the amount of sulfate remaining on the aluminum oxide immediately following the initial decomposition reaction.

In the following example are set forth data derived from several runs made according to the process of this invention in which the aluminum sulfate hydrate was in solid particulate form, the particles being no larger than about 10 mesh in size.

Having thus disclosed our invention, and described in detail a preferred embodiment thereof, we claim and desire to secure by Letters Patent:

1. A process for the production of aluminum oxide from aluminum sulfate which comprises the steps of introducing hydrated aluminum sulfate in solid particulate form including fines at a controlled rate into the upper end of an elongated, vertically disposed reaction zone heated externally to an internal temperature above the decomposition temperature of aluminum sulfate, thereby decomposing the aluminum sulfate to aluminum oxide and gaseous oxides of sulfur and liberating the water therefrom as the sulfate flows by gravity through said reaction zone, removing the gaseous oxides and water vapor from the upper end of said zone, collecting the solid aluminum oxide in the lower end of said zone out of contact with said gaseous oxides and water vapor, heating the aluminum oxide therein in a substantially moisture-free atmosphere to decompose the major portion of the sulfate remaining adsorbed thereon, recovering the aluminum oxide, and recycling the fines to the reaction zone.

2. The process of claim 1 in which the aluminum sulfate is introduced into the reaction zone as a spray in liquid form.

3. The process of claim 1 in which the temperature in the reaction zone is between about 770° C. and 1100° C.

4. The process of claim 1 in which the aluminum sulfate is delivered to the reaction zone at a point substantially distant from the point of gaseous oxides withdrawal.

5. The process of claim 1 further characterized by conducting the gaseous oxides through a separation zone, therein separating the entrained solids from the gaseous oxides, and recycling the solids to the reaction zone.

6. The process of claim 1 in which the solid product is retained in the lower end of the reaction zone for 30–120 minutes.

7. Apparatus for the production of aluminum oxide from hydrated aluminum sulfate, comprising a vertically disposed furnace enclosing an elongated refractory reactor, an inlet connection for the sulfate and a gas outlet connection both located in the upper end of the reactor, connections to said inlet for admitting recirculated fines to the reactor, a cylindrical baffle axially aligned with said inlet and extending downwardly as an extension thereof into the reactor for a substantial distance, thus preventing the sulfate from escaping directly to the outlet connection, and an outlet for solid aluminum oxide in the bottom of the reactor.

| Run No. | 4 | 5 | 7 | 8 | 9 | 10 | 11 | 12 | V6 | G1 |
|---|---|---|---|---|---|---|---|---|---|---|
| Wt. of feed (gms.) | 130.9 | 523 | 603 | 341.9 | 603 | 603 | 603 | 603 | 357 | |
| Time to feed (mins.) | 40 | 28½ | 29 | 45 | 70 | 30 | 92 | 102 | 30 | |
| Al₂O₃ residence in reactor (mins.) | 60 | 88½ | 89 | 75 | 80 | 80 | 60 | 120 | 120 | |
| Wt. of Al₂O₃ prod. (gms.) | 16.4 | 75.3 | 86.3 | 50.4 | 73.4 | 75.4 | 73.1 | 86.7 | 96.6 | |
| Yield percent of theoretical | 75 | 86 | 85 | 88 | 72 | 73.9 | 71.7 | 83.8 | 95 | |
| Reaction zone temp., °C | 920 | 1,030 | 1,080 | 1,085 | 1,135 | 1,060 | 1,075 | 940 | 1,000 | |
| Surf. area of Al₂O₃ (M.²/gm.) | 108 | 86.2 | 88.2 | 83.8 | 60.2 | 121 | 115 | 143 | 82.4 | 64.5 |
| Sulfate remaining on Al₂O₃, percent by wt. | 2.94 | 0.38 | 0.00 | 0.24 | 0.00 | 0.00 | 0.00 | 4.76 | 2.03 | 2.10 |
| Density, lbs./cu. ft. | 2.62 | 2.76 | 2.50 | | 3.20 | 2.83 | 2.40 | 2.10 | 13.9 | 17.4 |

Run V6 was made with a 94.4% dehydrated aluminum sulfate as the raw material. It will be noted that a much higher bulk density is achieved when the raw material is first dehydrated but that a longer residence time in the reactor is required, the surface area of the product is lower than that of the hydrate products and the sulfate remaining on the oxide is high considering the residence time.

Run G1 represents aluminum oxide produced by roasting dehydrated aluminum sulfate in a kiln. The surface area of the produce is comparatively low.

This application is filed as a continuation of our co-pending application Serial No. 323,682, filed December 2, 1952, now abandoned.

8. A process for the production of aluminum oxide from aluminum sulfate which comprises the steps of downwardly directing hydrated aluminum sulfate in solid particulate form at a controlled rate into the upper end of an elongated, vertically disposed reaction zone heated externally to an internal temperature above the decomposition temperature of aluminum sulfate, thereby decomposing the aluminum sulfate to aluminum oxide and gaseous oxides of sulfur and liberating the water therefrom as the sulfate flows by gravity through said reaction zone, removing the gaseous oxides and water vapor from the upper end of said zone, collecting the solid aluminum oxide in the lower end of said zone out of contact with said gaseous oxides and water vapor, heating the aluminum oxide therein in a substantially moisture-free atmosphere to decompose the major portion of the sulfate remaining admixed therewith after the initial reaction, and recovering the fine aluminum oxide thus produced.

References Cited in the file of this patent

UNITED STATES PATENTS

| | | |
|---|---|---|
| 1,132,736 | Schwahn | Mar. 23, 1915 |
| 1,652,119 | Halvorsen et al. | Dec. 6, 1927 |
| 2,155,119 | Ebner | Apr. 18, 1939 |
| 2,402,471 | Tuwinner et al. | June 18, 1946 |
| 2,431,370 | Chirnside et al. | Nov. 25, 1947 |